A. C. R. JANNI.
REINFORCING BAR.
APPLICATION FILED FEB. 27, 1907.

No. 900,379.

Patented Oct. 6, 1908.

Witnesses:
Chas. J. Becker
Elliott R. Goldsmith

Inventor:
Alfred C. R. Janni,
By Hugh K. Wagner,
His Attorney.

UNITED STATES PATENT OFFICE.

ALFRED C. R. JANNI, OF ST. LOUIS, MISSOURI.

REINFORCING-BAR.

No. 900,379.    Specification of Letters Patent.    Patented Oct. 6, 1908.

Application filed February 27, 1907. Serial No. 359,604.

*To all whom it may concern:*

Be it known that I, ALFRED C. R. JANNI, a subject of the King of Italy, residing at the city of St. Louis and State of Missouri, have invented certain new and useful Improvements in Reinforcing-Bars, of which the following is a specification, reference being had therein to the accompanying drawing.

This invention relates to means for reinforcing concrete or cement, and has for its object to provide a new and improved metal beam or bar to be embedded in the concrete.

Figure 1:
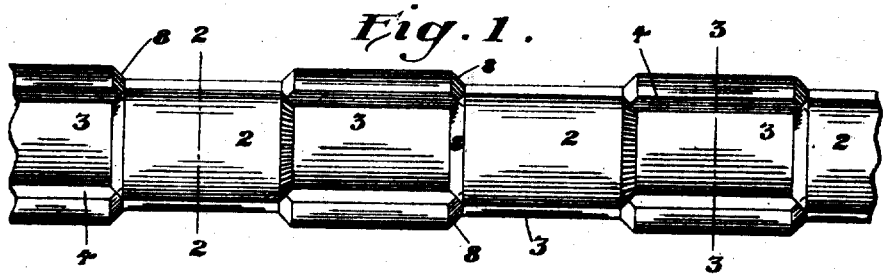
Figure 2:
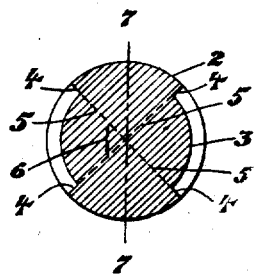
Figure 3:
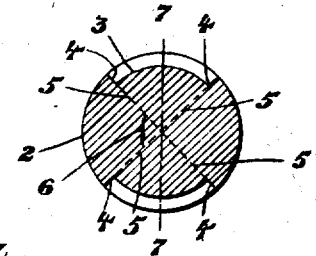
Figure 4:
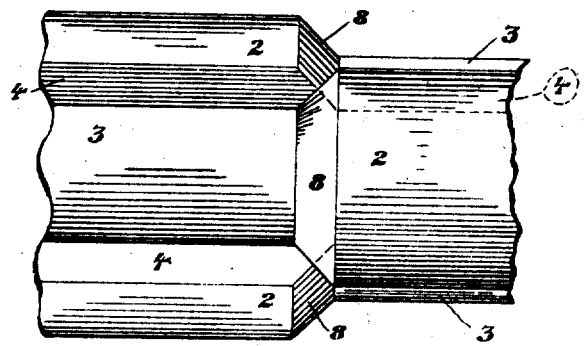

In the drawings forming part of this specification, in which like numbers of reference denote like parts wherever they occur, Figure 1 is a side elevation of a bar embodying the invention; Fig. 2 is a section on the line 2—2, Fig. 1; Fig. 3 is a section on the line 3—3, Fig. 1; and Fig. 4 is an enlarged detail view of a part of the bar shown in Fig. 1.

It has, heretofore, been customary to provide, in concrete reinforcement, square bars which have various forms of corrugations thereupon, and the essential feature of the present invention is the use of cylindrical bars in lieu thereof, said cylindrical bars having corrugations of a certain type hereinafter described which are so placed on the periphery of the bar as to cause the cross-section taken at any point on the bar to be similar in shape and equal in area to the cross-section taken at any other point.

Among the advantages which arise from the use of bars of the type herein described, the following should be noted: Since the bars are of metal (usually iron or steel) they contract or expand with the variations in temperature. When a bar of uniform thickness is used, the contraction or expansion is evenly distributed at all points throughout its length, whereas, with a bar thicker in some places than others, there is no such equality of expansion, but the outward pressure at the thick parts of the bar is greater than that at the thin parts. With a cylindrical bar, moreover, the contraction or expansion is evenly distributed throughout its surface, and, when the bar expands, for example, it presses out with equal force in all directions, and thus does not disrupt the concrete. With a square or angularly-shaped bar, however, this outward pressure is not uniformly distributed, and the edges of the bar often chip off in the concrete, or, by acting as a wedge, crack the concrete, thereby both weakening the concrete and exposing the bars to moisture, causing them in time to rust. Sharp edges or angular bars, moreover, tend to shear off the concrete, and, if the bar be given a sudden impact, will sometimes shear or cut off a large section of the concrete.

It is uneconomical to use bars varying in thickness at different points, because the tensile strength of the bar is determined by its thickness at the thinnest point. In one sense, therefore, the metal which forms the corrugations is wasted, since the corrugation does not increase the tensile strength of the bar, yet it must be paid for, since the bars are all sold on the basis of weight, and, as the corrugations compose by no means a negligible proportion of the weight of the bar, it will be seen that, in a large structure, the metal which is paid for, but which is not used to best advantage, unnecessarily adds to the expense of construction. When bars like those herein described are used, however, owing to the fact that the area of the cross-section at all points is the same, and, accordingly, the tensile strength is uniform throughout, every part of the bar, whether in the corrugations or not, contributes to the strength thereof, and thus makes it possible to secure the same tensile strength from a less weight of metal than is possible with any other corrugated bar. The use of a bar of uniform cross section facilitates the making of the necessary mathematical calculations, such as determining the number of bars required, the dimensions thereof, stress, strain, strength, and the like, and these can be determined more accurately than is possible where old-style bars are to be used.

The bar 1 is cylindrical in shape, and may be of any desired length or diameter, the dimensions depending on the character of the construction in which the bars are to be used. At regular intervals on the circumference of the bar, and arranged in longitudinal and circumferential rows thereon, are corrugations or projections 2, which corrugations alternate, both circumferentially and longitudinally, with depressions 3, in such manner that adjacent each edge of each corrugation 2 is a depression 3, and so that each depression 3 is bounded substantially on all sides by corrugations 2. If a transverse section be taken at any point of the bar, as on the lines 2—2 or 3—3, Fig. 1, it will be seen that around the periphery thereof are found, in the order named, corrugation, depression, corrugation, depression; while, if a line should be drawn on the periphery parallel to the axis of the bar, along said line would be found the same regular alternation of corrugations with depressions. If the circumference of the bar could be spread out flat it would, owing to the alternation of corrugations and depressions, present a checkerboard-like appearance, half of the squares being raised.

The corrugations 2 are, preferably, formed with two edges perpendicular to the periphery of the bar 1 and two beveled edges, the sides or edges 4 which are parallel to the axis of the bar being thus perpendicular and lying in a plane which, if produced as indicated by the dotted lines 5, Figs. 2 and 3, would pass through said axis. If the planes bounding both sides of any corrugations should be thus produced, the angle 6 at the point of intersection of said planes would be an angle of 90°. Each corrugation, therefore, with its sides 4 produced, is a sector having 90° of arc on the circle formed by taking a transverse section through the bar. Each depression, also, measures 90° on this same circle. A plane passed through line 7—7, Fig. 2, would, likewise, pass through line 7—7, Fig. 3. Since any strain on these bars is generally exerted longitudinally, rather than as torque, and the bars tend to slip within the concrete along the direction of their length, rather than to be twisted, it is more important to prevent endwise-slipping of the bars than it is to guard against twisting. Accordingly, the longitudinal ends of the corrugations terminate in the beveled edges 8, instead of in edges perpendicular to the periphery.

It is desirable to have the concrete completely fill the depressions 3 and pack tightly, so as to leave as little vacant space as possible between the concrete and the surface of the bar. Where the edges of the corrugations are perpendicular to the periphery, the concrete tends to bridge the corners, leaving a vacant space between the concrete and the corner, thus tending to allow the bar to work loose and slip within the concrete. If the edges 8 were perpendicular to the periphery, so that the concrete might bridge thereover, leaving a vacant space at each end of the corrugations, the corrugations might have some back-and-forth play within the concrete, and this vacant space would gradually increase in size, as a straight, sharp edge 8 would tend to shear, cut, or abrade the concrete, thereby allowing the bar to become loose and slip. By providing beveled edges 8, however, this tendency is obviated, as the concrete will fit snugly over the bevel, and completely fill the depressions 3 adjacent the ends of corrugations 2, so that the corrugations can not work back and forth within the concrete. Moreover, in case there should be any vacant space between the concrete and the ends of the corrugations, said beveled edges will not have the same tendency to enlarge the vacant space as would be manifested by an edge perpendicular to the periphery.

While the concrete may not pack snugly over the sides 4 of the corrugations, and some vacant space may be left between the concrete and side 4, owing to the fact that there is little tendency for the bars to twist, it is not necessary to bevel edges 4. This may, however, be done where special circumstances may render such construction necessary.

Having thus described my said invention, what I claim and desire to secure by Letters-Patent is:

1. A concrete-reinforcing bar cylindrical in shape and of constant cross-sectional area, the surface of said bar being provided with a plurality of longitudinal and a plurality of circumferential rows of projections, each circumferential and each longitudinal row comprising the succession of a projection, a depression, a projection, and a depression, the sides of each projection extending to but not beyond the sides of each adjoining projection, the ends of adjoining projections being so related to each other that the bottom edge of each end of any projection lies beyond the bottom edge of the end of each adjoining projection, while the top edge of said first-mentioned projection falls short of the top edge of the end of each adjoining projection.

2. A concrete-reinforcing bar cylindrical in shape and of constant cross-sectional area, the surface of said bar being provided with a plurality of longitudinal and a plurality of circumferential rows of projections, each circumferential and each longitudinal row comprising the succession of a projection, a depression, a projection, and a depression, the sides of each projection extending to but not beyond the sides of each adjoining projection, the ends of adjoining projections being so related to each other that the bottom edge of each end of any projection lies beyond the bottom edge of the end of each adjoining projection, while the top edge of said first-mentioned projection falls short of the top edge of the end of each adjoining projection, each projection occupying approximately the same proportion of the surface of the bar as any other projection or as any depression.

3. A concrete-reinforcing bar cylindrical in shape and of constant cross-sectional area, the surface of said bar being provided with a plurality of longitudinal and a plurality of circumferential rows of projections, each circumferential and each longitudinal row comprising the succession of a projection, a depression, a projection, and a depression, the sides of each projection extending to but not beyond the sides of each adjoining projection, the ends of adjoining projections being beveled and so related to each other that the bottom edge of the end of any projection is in circumferential alinement with the top edge of the end of each adjoining projection, and the bottom edge of the end of each second-mentioned projection is in circumferential alinement with the top edge of the end of said first-mentioned projection.

In testimony whereof I have affixed my signature in presence of two witnesses.

ALFRED C. R. JANNI.

Witnesses:
GLADYS WALTON,
HUGH K. WAGNER.